(12) United States Patent
Bender et al.

(10) Patent No.: US 7,563,325 B2
(45) Date of Patent: Jul. 21, 2009

(54) WURSTER FLUID BED COATER WITH FLUIDIZING GAS DISTRIBUTION PLATE BYPASS

(76) Inventors: Martin P. Bender, 1759 Cliffside Ct., Naperville, IL (US) 60502-9678; Joseph P. Szczap, 1428 Duquesne Ave., Naperville, IL (US) 60565; Donald P. Verbarg, 15625 Lisbon Center Rd., Newark, IL (US) 60541

( * ) Notice: Subject to any disclaimer, the term of this patent is extended or adjusted under 35 U.S.C. 154(b) by 427 days.

(21) Appl. No.: 11/478,903

(22) Filed: Jun. 30, 2006

(65) Prior Publication Data

US 2008/0000419 A1    Jan. 3, 2008

(51) Int. Cl.
B05C 5/00 (2006.01)
B05C 11/06 (2006.01)
B01J 8/18 (2006.01)
A23G 3/26 (2006.01)

(52) U.S. Cl. .......................... 118/303; 118/62; 118/19; 118/24; 422/139

(58) Field of Classification Search ................. 118/303, 118/DIG. 5, 62–64, 19, 24; 427/185, 213; 239/424, 424.5; 422/139, 143, 145, 147
See application file for complete search history.

(56) References Cited

U.S. PATENT DOCUMENTS 5,891,401 A * 4/1999 D'Acierno et al. .......... 422/143
6,579,365 B1 * 6/2003 Jones et al. ................. 118/303

* cited by examiner

Primary Examiner—Yewebdar T Tadesse

(57) ABSTRACT

An improved Wurster coater in which conditioned fluidizing gas, drawn through a coating chamber bowl from a plenum by a vacuum fan, is directed through a perforated gas distribution plate through one or more Wurster tubes. The perforated gas distribution plate defines three concentric gas flow zones: a central high-flow up-bed zone beneath the Wurster tube, a surrounding annular lower-flow down-bed zone, and an outer peripheral bypass zone defining a bypass cavity underlying the outer lower wall of the bowl. A controlled bypass flow of conditioned fluidizing gas is directed into the bypass zone, either around the edge of the distribution plate or through relatively larger holes in its plate's outer periphery, which causes that portion of the fluidizing gas to flow radially inward across the distribution plate, thereby sweeping particles away which would otherwise stagnate at the inner corners of the bowl due to low gas velocity in that region. The depth of the cavity is adjustable for varying the pressure drop, and thereby the volume and velocity, of the bypass gas stream.

6 Claims, 3 Drawing Sheets

WURSTER FLUID BED COATER WITH FLUIDIZING GAS DISTRIBUTION PLATE BYPASS

BACKGROUND OF THE INVENTION

The present invention relates to an improved method and apparatus for controlling movement of product to be coated from the down-bed region to the up-bed region of a Wurster-type fluid bed coater. The well-known Wurster apparatus and process is used for coating particulate material (such as powders, granules, seeds, beads, pellets or tablets) in a batch fluidized bed dryer. The fluid bed is widely used for drying powders, creating granules via agglomeration, or coating powders, granules or tablets of pharmaceutical, food and chemical ingredients.

DESCRIPTION OF THE PRIOR ART

The Wurster coating process relies upon a continuous conditioned gas stream which moves the product (such as powders, granules, seeds, beads, pellets or tablets) past one or more spray nozzles for purposes of coating, layering, and ultimately drying the finished product. Conditioning of the gas stream to maintain a specified temperature and humidity is essential for creating the optimum environment within the fluid bed to achieve the desired coating of the processed product.

Typically, a Wurster apparatus comprises a container with an outer wall, commonly referred to as a bowl, having one or more internal upwardly-extending cylindrical inner partitions or "Wurster tubes", each tube being suspended over a perforated gas distribution plate, often with an optional screen, which defines the bottom of the bowl. There is an adjustable gap between the bottom of the Wurster tube's bottom edge and the distribution plate. The width of the gap is adjustable depending upon the size of the product being coated and the velocity desired for the product passing through the gap. Within each Wurster tube is a spray nozzle connected to a pressurized source of coating fluid. Each Wurster tube thus defines a cylindrical up-bed region inside the tube where coating takes place, and an annular down-bed region surrounding it where the fluidized product returns to the gap and re-enters the up-bed region.

Beneath each Wurster tube, the central zone of the distribution plate has a high-flow zone of relatively larger and/or more numerous perforations which allow the gas to flow upward into the up-bed region at a relatively higher volume and/or velocity. Surrounding the high-flow zone at the center of the distribution plate is an annular second zone containing smaller and/or less numerous perforations for directing gas flow at a decreased velocity into the down-bed region. In this manner a recirculating product flow is created within the bowl by the Venturi effect of higher velocity gas from the central region through the up-bed region inside of the Wurster tubes, and lower gas flow supporting the product as it returns through the surrounding down-bed region prior to re-entering the up-bed region through the adjustable gap.

Within the up-bed region of each Wurster tube, the higher velocity gas transports the particles of feed material past a centrally positioned spray nozzle for coating the passing material with a coating solution. After passing through the spray, the product enters a region of lower gas velocity in an expansion chamber portion positioned above the Wurster tubes. As the product exits the Wurster tubes into the expansion chamber, the gas velocity is no longer sufficient to support it, allowing it to fall into the down-bed region, through which it descends through the bowl and recirculates through the adjustable gap at the bottom of the Wurster tube, whereupon it is again drawn by the higher velocity gas passing through the central zone of the distribution plate into the Wurster tube up-bed region, where it is repeatedly recirculated past the spray nozzle until it becomes coated to the desired finished specification.

Various forms of the Wurster apparatus and process are disclosed in U.S. Pat. Nos. 2,648,609, 2,799,241, 3,089,824, 3,196,827, 3,207,824, 3,253,944 and 6,597,365. These and other prior patents have acknowledged that heavier tablets do not uniformly cycle through the coating process. In the down-bed region of a conventional Wurster apparatus, some of the particulate material granules, seeds or tablets tend to fall close to the side wall of the fluid bed bowl and accumulate or lodge in the corner formed by the junction of the side wall and distribution plate. Those particles which are thus delayed or caused to lodge in this region of slower-moving gas do not properly return to the main circulation of product flow into the up-bed region of the Wurster tube and do not receive the same uniform coating as the balance of the product flow.

The problem of less than 100 percent product recirculation has been addressed by others with varying degrees of success, sometimes by placing larger holes in the outer zone of the gas distribution plate to increase the relative gas flow at the outer edges of the bowl. However, the inventors have found this modification to be sometimes ineffective by itself for certain kinds of processes and products, particularly for the manufacture of coated tablets.

Another way of addressing this deficiency has been disclosed by U.S. Pat. No. 6,597,365, in which the bowl is fitted with an additional and separate external circumferential manifold having its own separate supply of pressurized air, through which an inwardly-directed radial blast of air is introduced from outside the bottom of the bowl wall to displace particles upwardly and inwardly across the distribution plate toward the Wurster tube. In this way, the downward-moving product is prevented from pooling or accumulating around the lower inner periphery of the chamber wall. However, the solution proposed by U.S. Pat. No. 6,597,365 has its own inherent disadvantages. It specifically requires a separate source of pressurized air, with its attendant requirement for various additional extraneous hardware and devices. Because the compressed air issuing from such a separate external source is not necessarily at the same temperature and degree of dryness as the carefully conditioned main fluidizing stream of gas being drawn through the coating chamber, it has the potential of unbalancing and thus upsetting the pressure and temperature of the entire coating environment. In addition, the injection of outside air under a significant pressure differential also presents the danger of particle or tablet attrition by reason of the particles or tablets being knocked violently against each other, thereby causing them to be worn down, chipped, or even broken apart.

SUMMARY OF THE INVENTION

The inventors have been able to achieve the desired objective of preventing uneven or incomplete circulation of product in a Wurster coater without the need for a separate source of pressurized gas. This is accomplished by creating a cavity above the outer portion of the gas distribution plate from which is directed a bypass flow portion of the fluidizing gas at relatively higher velocity to sweep product from the junction formed by the bowl wall with the fluidizing gas distribution plate.

According to the present invention, this result is achieved in either or both of two ways: by providing the distribution plate with a third annular zone, referred to as the "bypass zone" which redirects a portion of the already conditioned fluidizing gas stream to bypass the down-bed portion of the air distribution plate; and/or by creating a separate gas passage around the distribution plate's outer edge. The bypass flow through the distribution plate flows through a bypass zone located at the outer periphery of the distribution plate which has larger openings, and hence a lower pressure drop, thereby allowing a greater volume of gas flow through that zone of the distribution plate. The bypass flow through the separate gas passage comes from allowing a portion of fluidizing gas to pass around the outer edge of the distribution plate.

According to the invention, the lower chamber and distribution plate of the present invention have a diameter greater than the lower rim of the bowl, and are spaced downward from the bowl's lower rim, thereby forming an annular cavity called the "bypass cavity". The bypass flow through the bypass cavity is thus directed radially inward into the base of the bowl for picking up and carrying along those particles which would otherwise tend to pool or accumulate at the lower edge of the bowl. By varying the position of the distribution plate relative to the lower rim of the bowl, the depth of the cavity can be adjusted to vary the pressure drop in the bypass zone, thereby allowing the user to control the volume and velocity of the bypass gas stream passing through the bypass cavity and radially inward into the chamber at the lower rim of the bowl. In this manner that portion of fluidizing entering circumferentially through the bypass zone can be adjusted to an optimum velocity by which product that might otherwise tend to collect in the lower corners of the bowl is lightly and gently pushed radially inward toward the Wurster tube until it re-enters the main gas stream from the high-flow central zone of the distribution plate and is propelled upward through the up-bed region and past the spray nozzle.

It is therefore a principal object of the present invention to overcome the deficiencies of the prior art for directing pooled or slower-moving product away from the lower corners of the chamber wall and into recirculating flow through the Wurster tube without the need for a separate source of pressurized air and its associated extraneous hardware and devices.

A related object of the invention is to achieve this objective without the risk of causing sudden or sharp changes in the gas environment (e.g., pressure, temperature and moisture content) within the fluid bed bowl which might otherwise be caused by the introduction of jets of gas from a separate or different pressure source which may well be at different and potentially incompatible conditions.

DETAILED DESCRIPTION OF THE INVENTION

Figure 1:
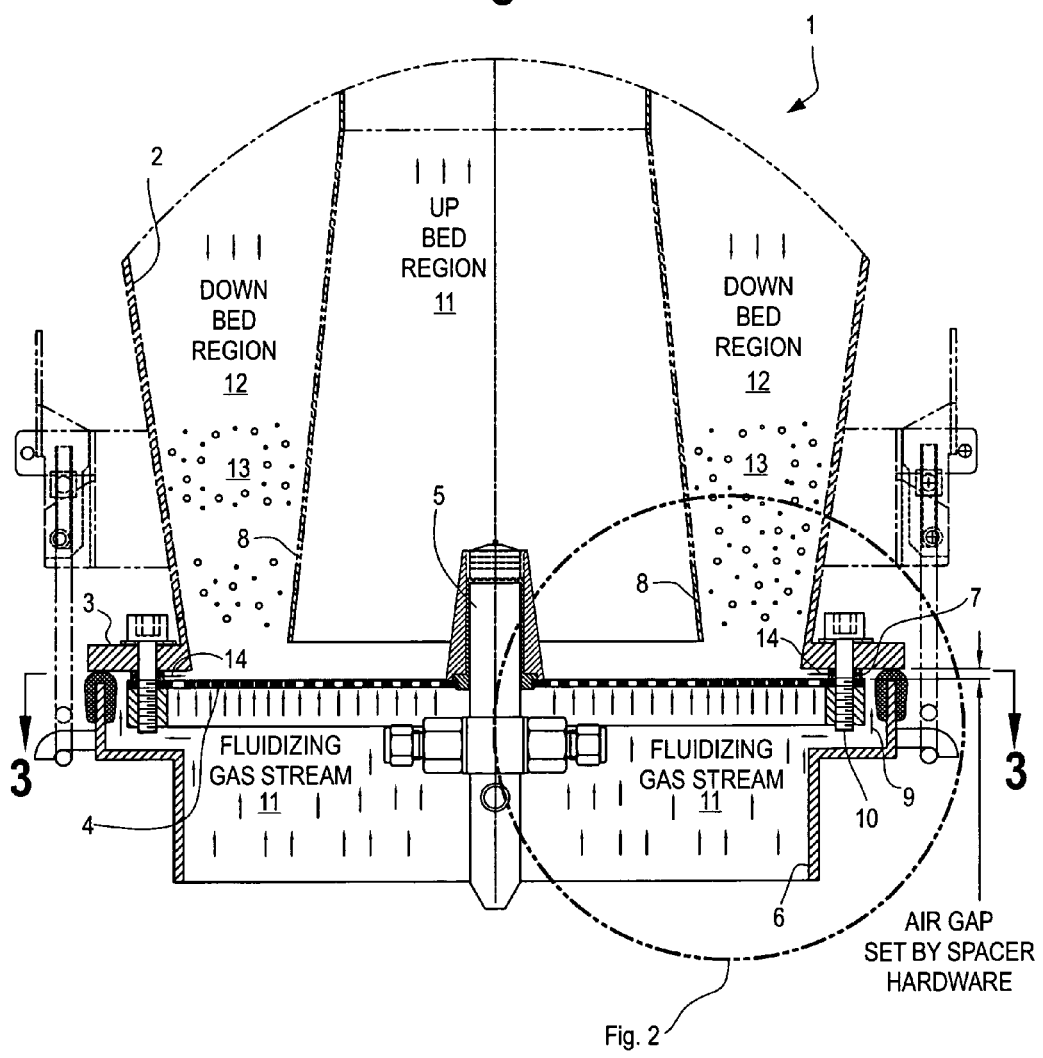
FIG. 1 is a sectional side elevation view of the improved Wurster apparatus of the present invention showing the relationship of the bowl, inlet gas plenum, Wurster tube and specialized fluidizing gas distribution plate and optional screen overlying the distribution plate.
Figure 2:
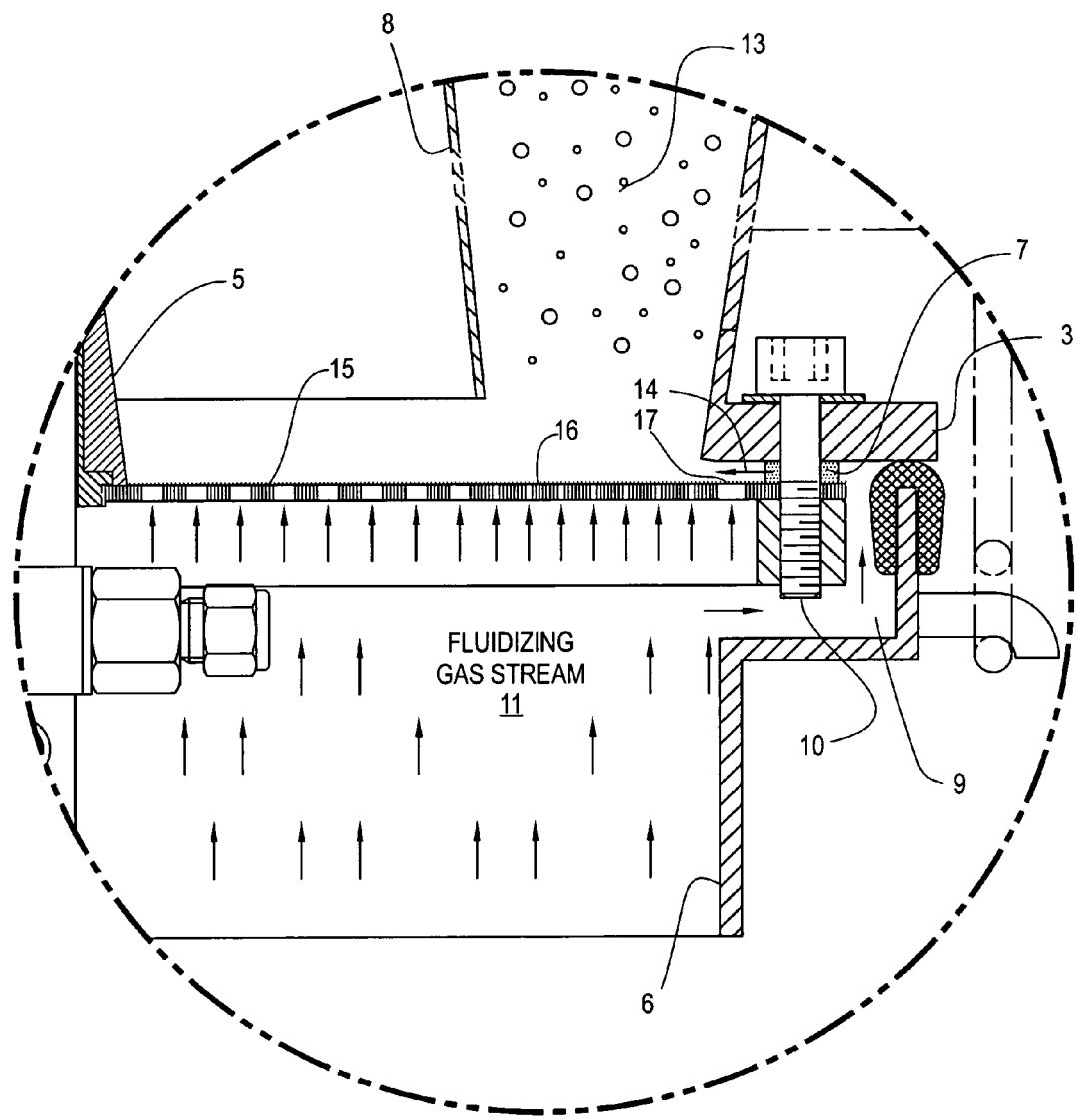
FIG. 2 is an enlarged sectional side elevation view of the apparatus of FIG. 1 showing the details of the outer edge of the specialized distribution plate and optional screen.
Figure 3:
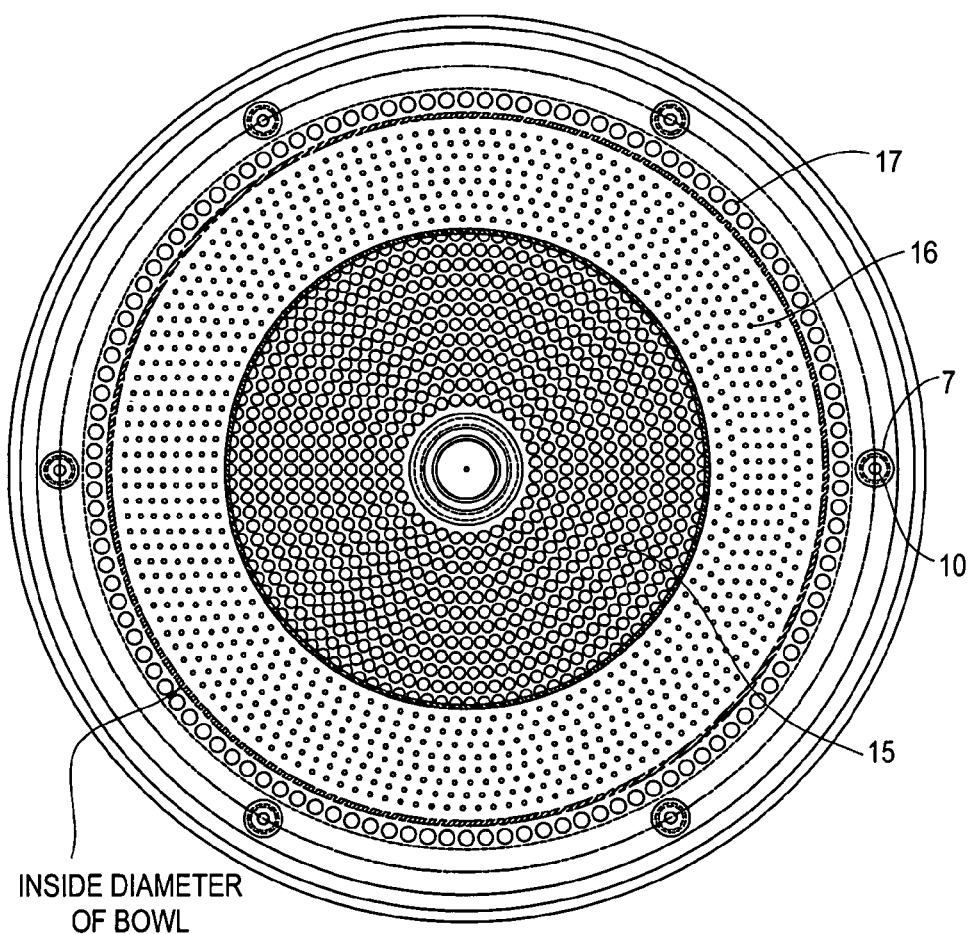
FIG. 3 is a plan view of the specialized distribution plate which forms a part of the present invention.

FIGS. 1 and 2 show a Wurster coater incorporating the improvements of the present invention. In common with prior art Wurster devices, the fluid bed coating device comprises a fluid bed bowl 1 having a cylindrical outer wall 2 terminating in a lower flange 3, and a perforated fluidizing gas distribution plate 4 above a plenum 6. Within the chamber above the bowl is a vacuum fan (not shown) and a product filter system (not shown) for retaining the coated product particles. The plenum is separate from the bowl and can be raised or lowered relative to the bowl for sealing the bowl against the upper filter chamber (not shown) for gaining access to the chamber's internal elements. The distribution plate 4 is held in place by holding hardware 10 including spacer washers 7 which draws it up against the bottom flange 3 of the fluid bed bowl.

For coating a product, the fluid bed bowl is commonly equipped with one or more individual Wurster tubes 8, each of which creates an up-bed region 11 within the bowl and a down-bed region 12 surrounding each tube. Each Wurster tube 8 is positioned above the distribution plate 4 by a predetermined gap through which product to be coated 13 flows out of the slower-moving down-bed region 12 and into the faster-moving up-bed region 11 where it is coated as it passes by the spray nozzle 5. The gas distribution plate 4 has larger holes in the central up-bed zone 15 (FIG. 2) directly beneath each Wurster tube 3, and fewer and smaller holes in the surrounding down-bed zone 16 so that the portion of the fluidizing gas stream passing up through the up-bed zone 15 of the distribution plate 4 has a greater volume and/or velocity than that passing up through the down-bed zone of the distribution plate 4. For this purpose, the hole pattern at the center of the distribution plate 4 is chosen to allow more gas to pass through its central inner up-bed zone 15.

As the product being coated 13 moves downward through the down-bed region 12, it is lightly fluidized by the outer annular flow of slower-moving gas passing through the down-bed zone 16. When the product 13 reaches the level of the bottom of the Wurster tube 8, it is drawn through the gap beneath the Wurster tube 8 by the differential in gas flow volume and velocity flowing through the down-bed zone 16 and up-bed zone 15 of the distribution plate 4, and propelled upward past the spray nozzle 5 and back into the bowl 1.

After the product 13 has flowed under the gap beneath the Wurster tube 8 into the up-bed region 11, it passes into the fully developed or atomized spray from the spray nozzle 5 through which a coating liquid is pumped, being driven and atomized by a supply of compressed gas (not shown). It should be understood that in practice, a commercial Wurster equipped fluid bed might comprise an array of multiple Wurster tubes 8, each separately creating its own central up-bed region 11 and sharing share a common external down-bed region 12 surrounding the Wurster tubes 8.

In the prior art, it has been suggested to blast larger product particles, such as tablets, out of the corner formed by junction of the bowl wall and the gas distribution plate by using a separate source of compressed gas (as in Jones U.S. Pat. No. 6,579,365). The present invention substantially improves on this system by incorporating flow redirection means including a gas distribution plate 4 which extends radially beyond the bottom of the bowl's lower wall 2 and spaced below it with spacer washers 7, forming an adjustable gap or bypass cavity 14. At its lower edge the bowl wall 2 terminates in an outwardly-extending flange 3, below which the distribution plate 4 is positioned a spaced distance away, defining an inwardly facing annular bypass cavity 14.

According to the invention, a third annular zone, referred to herein as the bypass zone 17, is created within the bowl 1 at the outer periphery of the distribution plate 4. Fluidizing gas 11 from the plenum 6 flows upward through the bypass zone 17 and or around gas distribution plate 4 into cavity 14 through an outer peripheral gap 9 and upon leaving cavity 14 is caused to be redirected inwardly, toward the bottom of the Wurster tube, whereby the descending product 13 is gently pushed or swept away from the corner junction formed by the bowl side wall 2 and the gas distribution plate 4, and back into the main stream of product flowing inwardly through the gap beneath the Wurster tube.

The depth of the bypass cavity 14 can be adjusted by using different spacer washers 7 held in place by threaded fasteners 10 or similar holding hardware. By varying the depth of the cavity 14, the pressure drop and thus the gas velocity through the annular bypass zone 17 and/or outer peripheral gap 9 into cavity 14 can be adjusted to obtain the optimum force and flow leaving the cavity 14 whereby the product 13 is gently pushed away from what would otherwise be a relatively stagnant corner formed by the junction of the bowl side wall 2 and the top of the distribution plate 4.

A principal advantage of the present invention is that this bypass flow is derived directly from the primary source of fluidizing gas 11 from the plenum 6, without the need of any separate source of pressurized gas, manifolds or jets. The bypass flow is directed by the bypass chamber 14 radially inward beneath the lower edge of the chamber wall 2. As a result, product which would otherwise tend to accumulate in this stagnant corner is effectively swept back into the fluidizing using the same conditioned gas source streams, thereby enhancing the uniformity of the process and serving to make a more homogenous end product.

What is claimed is:

1. In a Wurster fluidized-bed particle coating apparatus, said apparatus including a bowl having a lower peripheral flange, a plenum beneath said bowl, a gas source of conditioned fluidizing gas for pressurizing said plenum, a perforated gas distribution plate having an upper surface separating said plenum from said bowl, and at least one Wurster tube within said bowl and spaced above said perforated gas distribution plate, said Wurster tube defining a central up-bed particle flow region and a surrounding down-bed particle flow region and having spray nozzle means for directing a spray of coating liquid into said up-bed particle flow region for coating said particles, the improvement comprising:
   a) an annular bypass gas cavity underlying said bowl lower peripheral flange, and
   b) flow redirection means for supplying a bypass flow of conditioned fluidizing gas directly from said plenum through said annular bypass cavity and inwardly across the upper surface of said perforated gas distribution plate, whereby particles accumulating at said bowl lower peripheral flange are swept toward said at least one Wurster tube.

2. The improvement of claim 1 in which said flow redirection means comprises a distribution plate having an enlarged outer peripheral region underlying said bowl lower peripheral flange, and said enlarged outer peripheral region having relatively larger perforations for allowing conditioned fluidizing gas to flow from said plenum in relatively greater volume into said annular bypass gas cavity.

3. The improvement of claim 1 in which said flow redirection means comprises a perforated gas distribution plate having an enlarged outer peripheral region underlying said bowl lower peripheral flange, and further having an outer peripheral gap between said plenum and the outer edge of said perforated gas distribution plate for allowing conditioned fluidizing gas to flow from said plenum around said outer edge of said perforated gas distribution plate and into said annular bypass gas cavity.

4. The improvement of claim 1 in which said flow redirection means comprises a perforated gas distribution plate having an enlarged outer peripheral region underlying said bowl lower peripheral flange, said enlarged outer peripheral region having relatively larger perforations for allowing conditioned fluidizing gas to flow from said plenum in relatively greater volume into said annular bypass gas cavity, and further having an outer peripheral gap between said plenum and the outer edge of said perforated gas distribution plate for allowing conditioned fluidizing gas to flow from said plenum around said outer edge of said perforated gas distribution plate and into said annular bypass gas cavity.

5. The improvement of claim 1 or claim 2 further having adjustment means for selectively varying the space between said bowl lower inner peripheral flange and the upper surface of said perforated gas distribution plate, and thereby the depth of said annular bypass gas cavity, for optimizing the volume and velocity of flow inwardly across the upper surface of said perforated gas distribution plate.

6. The improvement of claim 5 in which said adjustment means comprises threaded fasteners affixed to said bowl lower inner peripheral flange by which said distribution plate is adjustably suspended beneath said bowl in spaced relationship thereto.

\* \* \* \* \*